United States Patent [19]

Fields

[11] Patent Number: 4,458,059
[45] Date of Patent: * Jul. 3, 1984

[54] LIQUID FILTRATION SYSTEM

[75] Inventor: Larry D. Fields, Mira Loma, Calif.

[73] Assignee: Yardney Corporation, Pawcatuck, Conn.

[*] Notice: The portion of the term of this patent subsequent to Apr. 10, 2000 has been disclaimed.

[21] Appl. No.: 526,274

[22] Filed: Aug. 25, 1983

[51] Int. Cl.³ .................... B01D 23/10; B01D 39/14
[52] U.S. Cl. .................... 210/266; 210/510.1
[58] Field of Search ............... 210/266, 283, 289–291, 210/504, 506, 510.1

[56] References Cited

U.S. PATENT DOCUMENTS 3,950,251  4/1976  Hiller ................................ 210/266
4,366,054  12/1982  Kronsbein ........................ 210/266

*Primary Examiner*—Ivars C. Cintins
*Attorney, Agent, or Firm*—Donald E. Nist

[57] ABSTRACT

An improved liquid filtration system is provided which comprises, in combination, a tank or other vessel having a central cavity and a liquid inlet tube and liquid outlet tube spaced apart. A porous, rigid, self-supporting removable filter is placed in the tank between the liquid inlet and liquid outlet and forms part of the system. The filter comprises a plurality of modules, each module comprising a self-supporting body of granules cemented together by set organic resin such as epoxy resin and disposed in a frame of, for example, fiberglass-reinforced nylon. Preferably, the modules are steeple shaped, placed in a circle or wheel configuration and removably secured to a cross plate fixed to the walls inside the tank. The upstream portion of the filter body in each module preferably contains a layer of fine aggregate while the downstream portion of the filter body preferably contains a layer of larger aggregate. The filter is relatively small and is positioned above the outlet to define a liquid redistribution space therebetween, which space facilitates improved back washing. The filter can be removed for cleaning and replacement and is light in weight. The filter supports a mass of loose particles of filtering medium disposed in the tank above the rigid filter. The system is light in weight, very efficient, inexpensive and durable.

11 Claims, 3 Drawing Figures

LIQUID FILTRATION SYSTEM

BACKGROUND OF THE INVENTION

1. Field of the Invention

The present invention generally relates for filtering means and more particularly pertains to an improved liquid filtering system for agricultural and industrial water and the like.

2. Prior Art

Various types of water filtration systems are in use to upgrade water for agricultural, industrial and domestic purposes. One commercial type of filtering system comprises a large metal or plastic tank having an inlet and an outlet remotely located from each other and containing in the central cavity of the tank adjacent the outlet a very large body of crushed rock or the like aggregate material cemented together by epoxy resin into a self-supporting porous mass. In some instances, the upstream portion of this mass is formed with fine particle size aggregate while the downstream portion is formed with larger size aggregate. Usually, the mass is formed in situ, with a bottom grating or screen supporting the mass slightly above the tank outlet. The mass is designed to occupy the entire bottom of the tank to prevent water from bypassing it before exiting the tank. The mass is extremely heavy and normally cannot be removed from the tank for replacement or repair unless the tank is torn apart. While this type of water filtration system is efficient, because of its extremely high weight it is costly to ship to the locations where it must be installed to be used. As noted above, it normally does not have the capability of being repaired without extensive cost.

In utilizing conventional filter tanks, it is necessary to periodically back wash to remove deposited solids from the filtering medium. Thus, water or other wash liquid is passed up the outlet into and through the tank and exits the inlet or back wash by-pass. Channeling of the wash liquid up through the filtering medium frequently occurs because the wash liquid does not contact the filtering medium across a broad front. This results in improper and inadequate washing of the filtering medium, reducing its life and utility.

Accordingly, there is a need for an improved type of water filtration system which can also be used in the filtration of other liquids. Such a system should be inexpensive, relatively light in weight and be capable of having the filter repaired and replaced as needed without necessitating destruction of the tank in which the filter is secured. The system should also be capable of being provided in a form which effectively prevents blowup of the tank during back washing if the pores of the filter become plugged. In conventional large mass filters, as described above, the filters or tank may blow up if the filters are plugged and the tank is back washed, causing destruction of the filtration system. Moreover, the system should feature easy, efficient and complete back washing to restore the integrity of the filtering medium.

SUMMARY OF THE INVENTION

The improved liquid filtration system of the present invention satisfies all the foregoing needs. The system is substantially as set forth in the Abstract above. Thus, the system comprises a tank or vessel having a central cavity, a liquid inlet and a liquid outlet. A porous self-supporting rigid filter of an improved type is releasably secured in the vessel over the outlet. The filter is light in weight, efficient, easily repairable and replaceable and prevents blowing up of the rigid filter or tank if the filter becomes plugged. Thus, in one embodiment excessive back pressure will result in separation of the rigid filter from around the outlet, by distortion or breaking of the connectors, thus relieving the back pressure and preventing major damage to the vessel and rigid filter.

The rigid filter comprises a plurality of modules, each of which comprises a body formed of aggregate cemented together by set organic resin such as epoxy resin or the like and disposed in a frame. The filter body preferably has a first upstream layer of fine aggregate and a second downstream layer of larger aggregate, the latter preferably being reinforced by cross members from the frame. Preferably, the modules are releasably secured to a plate extending all the way across the tank above the outlet and define a liquid distribution space with the outlet, to facilitate uniform rapid back washing. The modules are easily replaced for repair, cleaning, inspection, etc. and serve to support a loose mass of filtering medium in the tank.

Various other features of the improved liquid filtration system of the present invention are set forth in the accompanying drawings and detailed description.

DRAWINGS

DETAILED DESCRIPTION

Figure 1:
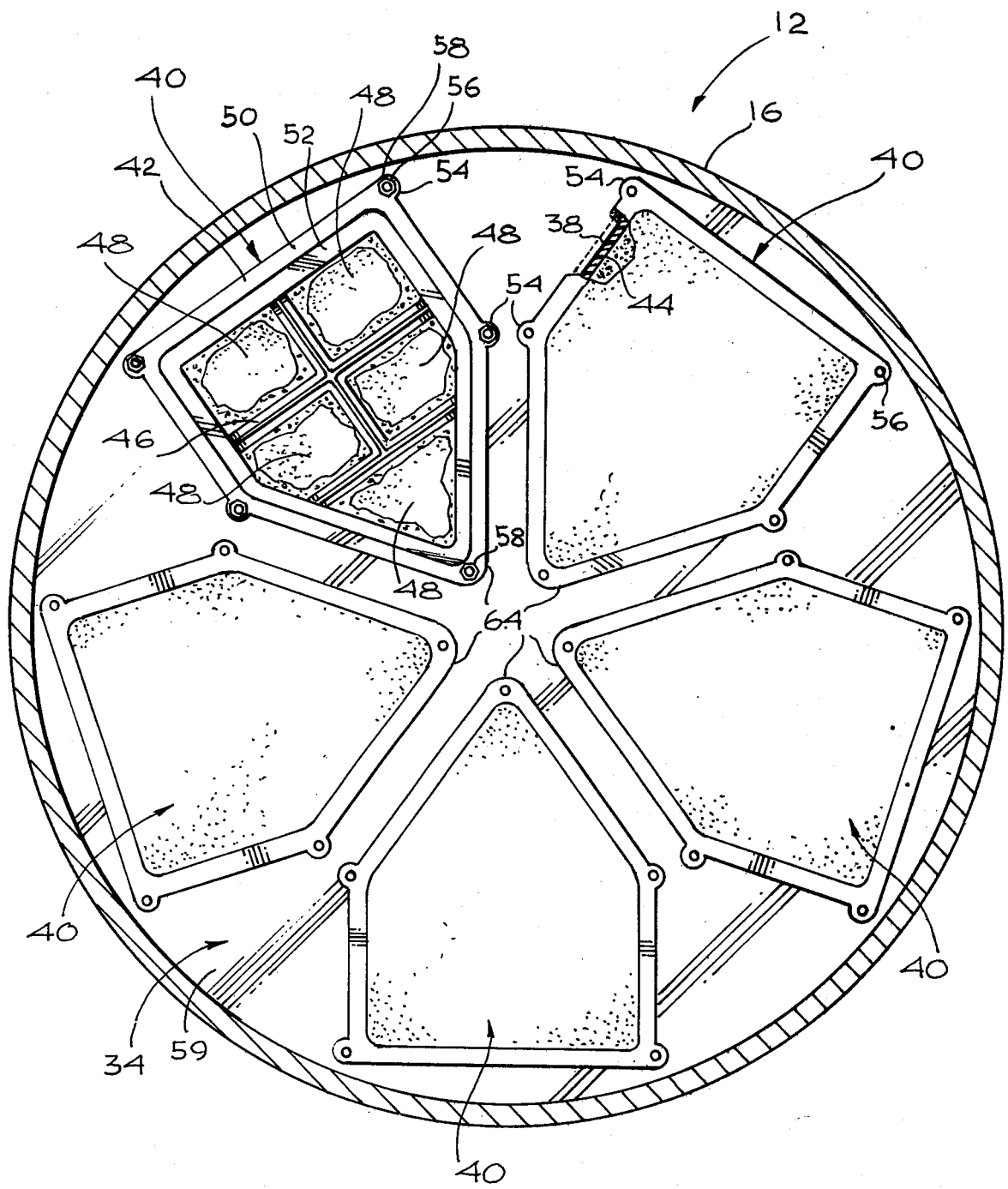
FIG. 1 is a schematic top plan view, partly broken away, of a preferred embodiment of the improved filtration system of the present invention, showing the support plate and array of five filter modules installed in a tank.
Figure 2:
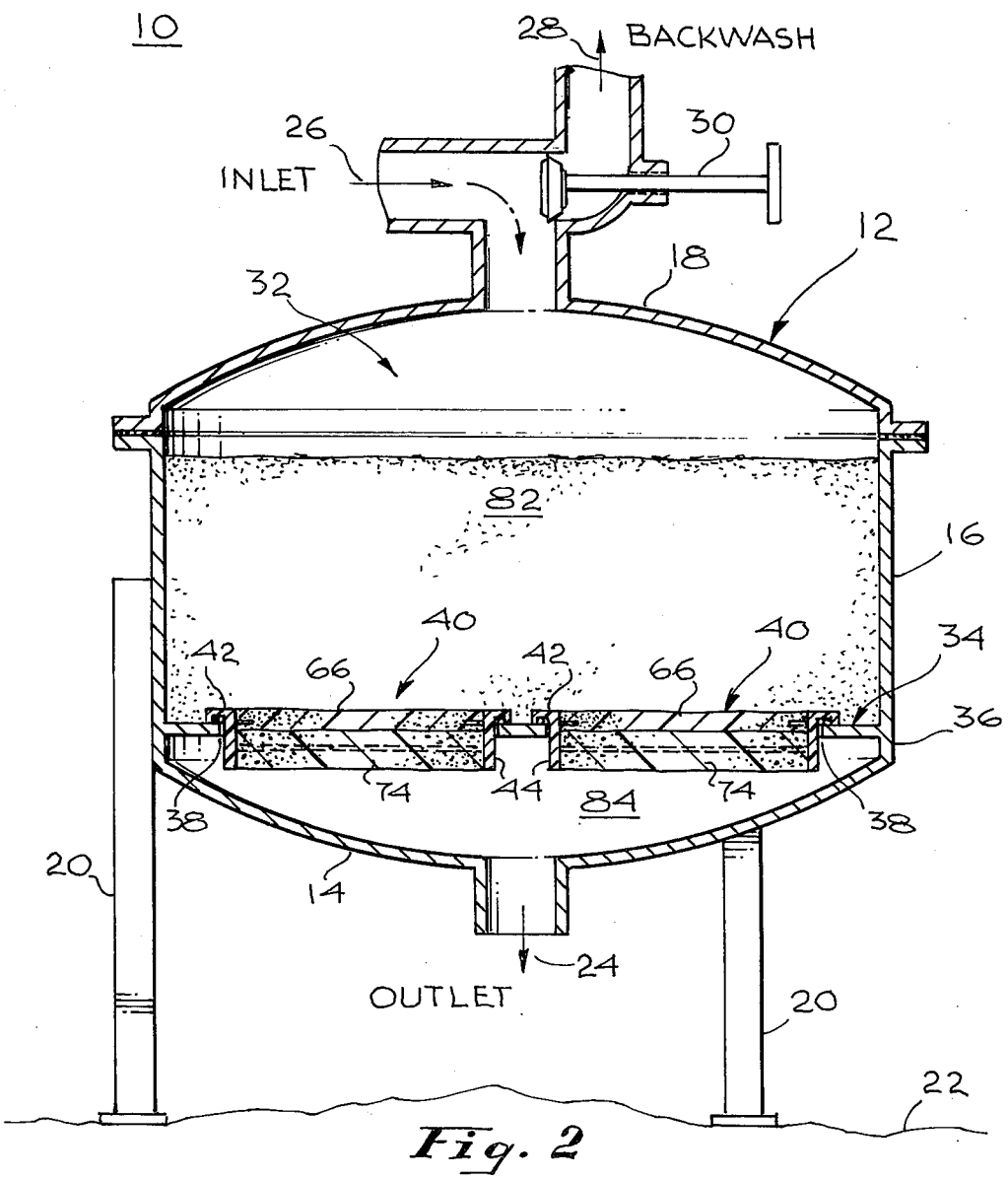
FIG. 2 is a schematic vertical cross section of the system of FIG. 1.
Figure 3:
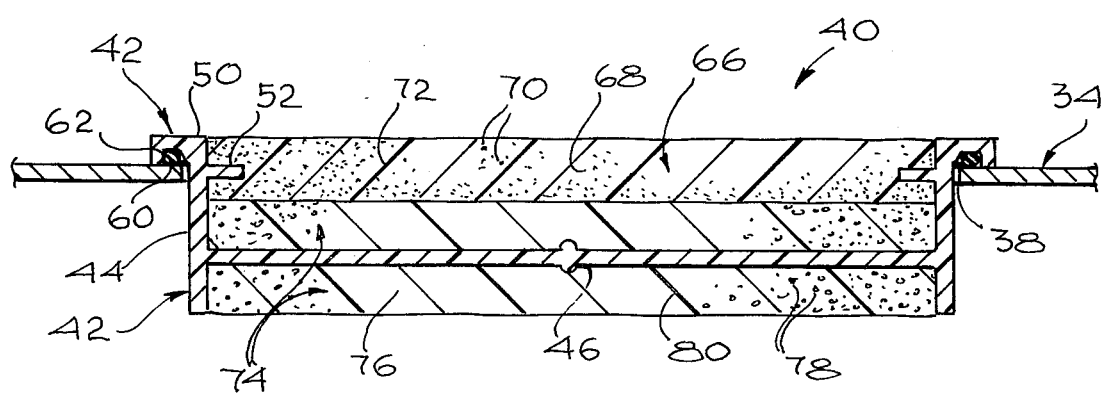
FIG. 3 is an enlarged schematic fragmentary vertical section of a module of FIG. 1, shown supported by the plate of FIG. 1.

FIGS. 1, 2 and 3

Now referring more particularly of FIG. 2 of the accompanying drawings, a preferred embodiment of the improved liquid filtration system of the present invention is schematically depicted therein in vertical cross section. Thus, system 10 is shown which comprises a tank 12 having a curved bottom portion 14, upstanding sidewalls 16 and closed top 18. Tank 12 is supported on a plurality of vertical legs 20 above the ground 22 and further includes a central bottom liquid outlet 24 and a central top inlet 26. The latter also includes a backwash exit 28 and a valve 30 controlling the use of that exit 28.

Tank 12 has a large central space 32 therein within which is disposed a horizontal plate 34 in the lower end 36 thereof above outlet 24. Plate 34 is secured at its outer periphery to sidewalls 16 so that liquid cannot bypass plate 34. Plate 34 has a plurality of apertures 38 extending down therethrough within which are releasably disposed a plurality of filter modules 40. Each filter module 40 may be of any suitable size or shape such as the steeple shaped configuration shown in FIG. 1 of the drawings comprising vertical sidewalls 44 interconnected by spaced cross members 46 as shown in FIG. 1. Thus cross members 46 divide the space defined by sidewalls 44 into five open bottomed cells 48. Preferably, cross members 46 are disposed approximately one-third of the way up from the bottom of sidewalls 44 and extend horizontally. Frame 42 further includes a top rim or flange 50 and an inwardly extending reinforcing lip 52 (FIG. 3) at the upper end of sidewalls 44. As will be particularly noted in FIG. 1, flange 50 includes five spaced ears 54 bearing apertures 56 therein for releasably affixing each module 40 to the upper surface 58 of horizontal plate 34, as by bolts 58. An elastomeric ring 60 is disposed around each module 40 in a recess 62 between flange 50 and sidewall 44, as shown in FIG. 3, to assure that module 40 is sealed against liquid passage between module 40 and plate 34.

It will be noted that five modules 40 are preferably disposed in a circular or wheel-shaped array in appropriately sized apertures 38 in plate 34 within tank 12. The pointed portion 64 of each module 40 is aligned toward the pointed portion 64 of the remaining modules 40 in the array.

Each module 40 contains two integrated layers of aggregate. The upstream or first layer 66 comprises a solid, porous filter body 68 of fine particulate particles 70 such as crushed granite or other rock, sand or the like, preferably having an average diameter of about 0.02–0.04" in a matrix 72 of set organic resin. Matrix 72 preferably comprises epoxy resin but can comprise any structurally stable resin which does not dissolve in the liquid being filtered. For example, phenolic, urea-formaldehyde and other types of resins can be employed. Normally, matrix 72 is utilized for filtering water but can also be utilized to filter other liquids such as alcoholic solutions, other organic liquids from various chemical processes, etc.

The average pore size in top layer 66 will vary, depending upon the relative proportions of matrix 72 and particles 70 in body 68 and the size of particles 70. However, the pore size is usually about 0.004–0.008". A downstream layer 74 in each module 40 is formed similarly to upstream layer 66 and differs therefrom only in that the filter body 76 thereof comprises particles 78 similar to particles 70 but of larger average diameter, for example, about 0.0125–0.375" and usually about 0.25" in diameter with an average pore size of about 0.015–0.020". Particles 78 are held together by matrix 80 identical to matrix 72 to form the self-supporting body 76.

Layer 68 is bonded to and supported by layer 74, the latter being preferably about twice as thick as the former, as shown in FIGS. 2 and 3. Moreover, the horizontal cross members 46 of frame 42 preferably pass through about the midline of layer 74 to support it. As can be noted from FIG. 3, layers 66 and 74 substantially fill each module 40 so that reinforcing lip 52 extends into and substantially supports upper layer 66. Thus, layers 66 and 74 fill cells 48 and enclose members 46. The set organic resin is usually present in a concentration in layers 66 and 74 relative to the particulate particles therein of about 5 to 10 pounds of resin plus hardener to about 100 pounds of particulate particles, although this range will vary, depending upon the resin. When epoxy resin is used, it can be cured at room temperature but preferably is cured at elevated temperature of about 120° F. or so, although higher temperatures can also be used.

When it is desired to replace one or more modules 40 bolts 58 are removed, after first opening tank 12 and removing filter medium 82 therefrom to expose modules 40. The unbolted module or modules 40 can then be lifted from plate 34 for replacement, cleaning, repair or the like. It will be understood that modules 40 can be of any desired configuration and any desired number can be disposed in plate 34. Thus, for example, the modules can be pie-shaped, rectangular, square, circular or any other configuration in plan view. Each module, however, will preferably contain layers 66 and 74 interconnected and disposed in open bottomed frame 42. Tank 12 preferably is metal but can be of any suitable material such as thick, reinforced plastic, ceramic or the like. Frame 42 preferably is of fiber-glass-reinforced nylon, plastic or the like but can be of metal, such as steel, aluminum, titanium, etc. Plate 34 can be fabricated of similar materials.

Tank 12 can be of any suitable internal and external configuration. Preferably plate 34 and tank 12 are circular in plan view. It will be noted that tank 12 contains mass 82 of loose particles of crushed rock, sand or the like, which may be of any suitable average particle size range. Mass 82 may be of any suitable thickness, for example, about 10'–50'. Mass 82 is supported by plate 34 and modules 40 which are arranged in tank 12 above outlet 24 and define therewith a liquid redistribution space 84. Space 84 has a particular value in the improved liquid filtration system of the present invention. Thus, after system 10 has been used for a certain period of time by passing liquid thereinto through inlet 26 and down through the primary filtering mass 82, then through the rigid filters of modules 40 into space 84 and out of tank 21 through outlet 24, at least the upper portion of mass 82 becomes partially clogged with solid matter filtered from the liquid. It then becomes necessary to backwash this solid material from mass 82. This is accomplished by passing wash liquid up outlet 24 into space 84 through modules 40 and up through mass 82. The liquid washes out the deposited solids desired to be removed from mass 82 and carries them out of tank 12 through backwash exit 28, valve 30 having been moved to a position to open that exit and block inlet 26.

Such a procedure is common to many filtration systems. However, in conventional filtration systems, a liquid redistribution space such as space 84 is not provided so that as the wash liquid passes up through the tank it has a tendency to channel through the loose filter mass and to wash only a portion of that mass in the tank, thereby regenerating only the washed portion. In contrast, present system 10 provides space 84 which is of relatively large size and has a diameter equal to the diameter of tank 12. Accordingly, wash liquid passing up through outlet 24 fills space 84 before passing up through modules 40 into mass 82. This has the effect of substantially simultaneously contacting mass 82 along substantially its entire diameter with wash liquid, so that there is no tendency for the liquid to channel through mass 82 and fail to wash a substantial portion thereof. Accordingly, mass 82 is completely regenerated in the fastest possible manner to improve the efficiency and longevity of system 10, in contrast with conventional filtration systems.

The improved liquid filtration system of the present invention can be utilized for a variety of purposes and the components thereof can be of any suitable proportions. In a typical agricultural water filtration application, tank 12 will be about 12–48" in diameter with a height of about 16–60". Each module 40 will contain, for example, about 1" thickness of layer 66 and about a 2" thickness of layer 74 disposed in frame 42 having, for example, an average width of about 15" and an average length of about 20", with 5 such modules 40 disposed generally as indicated in FIG. 1. The dimensions given for modules 40 are those which are suitable, for example, for a plate 34 having an average diameter of approximately 48". Each module 40 having the previously indicated dimensions and containing layers 66 and 74 will have, for example, a weight of approximately 50 pounds so that the combined weight of the 5 modules 40 will have a weight of approximately 250 pounds. This is in contrast to a conventional pored aggregate mass which may weigh as much as 700 pounds or more. It will also be noted that in the event of excessive back pressure during backwashing, modules 40 are likely to be blown up from plate 34 before tank 12 ruptures. This likelihood is increased if bolts 58 are made frangible.

Various other modifications can be made in the improved filtration system of the present invention and in the components and parameters thereof. All such modifications as are within the scope of the appended claims form part of the present invention.

What is claimed is:

1. An improved liquid filtration system, such system comprising, in combination:
    a. a vessel having a plurality of spaced interconnected walls defining a central cavity and having a liquid inlet spaced from a liquid outlet;
    b. a porous, self-supporting, rigid removable filter comprising a plurality of modules, each said module comprising a self-supporting filter body formed of a plurality of granules cemented together by set organic resin and disposed in a frame;
    c. connector means releasably securing said modules in said cavity adjacent said outlet so as to separate said outlet from said inlet; and,
    d. a mass of loose particles of filtering medium disposed above said rigid filter in said cavity and supported thereby.

2. The improved system of claim 1 wherein said inlet is above said outlet and wherein said filter body is spaced above said outlet to define a liquid redistribution space therebetween for improved back washing.

3. The improved system of claim 2 wherein said outlet is adjacent the lower end of said vessel and said inlet is adjacent the upper end of said vessel and wherein said filter and connector means extend substantially completely across said vessel to fully separate said inlet and outlet and to define said liquid distribution space.

4. The improved system of claim 3 wherein said connector means comprises a plate releasably secured to said modules and fixedly secured to the inner surfaces of said vessel walls.

5. The improved system of claim 4 wherein said filter body includes an upstream layer wherein said granules are of fine particulate form and wherein said body further includes a downstream layer wherein said granules are larger than the granules in said first layer, said first and second layers being sealed together.

6. The improved system of claim 5 wherein said frame includes a plurality of spaced cross members connected to and extending between said sidewalls and supporting said filter body.

7. The improved system of claim 6 wherein said cross members extend through and are bonded to said downstream layer.

8. The improved system of claim 7 wherein said mass of loose particles are sharp edged granite granules, wherein said upstream granules are crushed granite having an average diameter of about 0.02–0.04 inch and wherein said downstream granules are pea gravel having an average diameter of about 0.125–0.375 inch.

9. The improved system of claim 7 wherein said resin comprises epoxy resin present, together with resin hardener, in a weight ratio to said fine particulate granules of about 5–10:100.

10. The improved system of claim 7 wherein said frame is steeple shaped, has five cells and comprises fiberglass reinforced nylon.

11. The improved system of claim 10 wherein five of said modules are disposed in a circle with their steepled ends facing each other, to form said filter and wherein said cross members extend through about the midline of said downstream layer.

* * * * *